May 28, 1940.  G. E. LYNCH  2,202,258
APPARATUS FOR FILTERING GAS AND THE LIKE
Filed May 5, 1939  4 Sheets-Sheet 1

Fig.1  Fig.2

INVENTOR.
George E. Lynch
BY
ATTORNEY.

May 28, 1940.    G. E. LYNCH    2,202,258
APPARATUS FOR FILTERING GAS AND THE LIKE
Filed May 5, 1939    4 Sheets-Sheet 3

INVENTOR
George E. Lynch
BY
ATTORNEY

May 28, 1940.                G. E. LYNCH                2,202,258
              APPARATUS FOR FILTERING GAS AND THE LIKE
                        Filed May 5, 1939            4 Sheets-Sheet 4

INVENTOR.
George E. Lynch
BY
ATTORNEY.

Patented May 28, 1940

2,202,258

UNITED STATES PATENT OFFICE 2,202,258

APPARATUS FOR FILTERING GAS AND THE LIKE

George E. Lynch, Los Angeles, Calif.

Application May 5, 1939, Serial No. 271,921

12 Claims. (Cl. 183—46)

My invention relates to improvements in gas filters and it has for one object to provide a new and improved type of gas filter wherein the filtering wall or medium through which the gas passes and wherein it is filtered, is made up of a series of separate, independent, interlocking filtering sections which are assembled loosely together to form a continuous wall or curtain through which the gas may travel and within which the dust is separated from the gas and is collected in a place where it can be withdrawn for suitable disposition.

This application is a renewal of an application Serial No. 86,100, which was held abandoned November 29, 1938, for failure to supply new drawings within time limit.

Gas filters of this type are habitually used to filter hot gases. It is essential that the apparatus be immune to radical changes in temperature and so it is necessary that the individual sections shall be so assembled together that although they interlock and prevent leakage of gas, there is nothing in their assembling mechanism to interfere with relative expansion and contraction.

My invention relates more particularly to that type of gas filter which includes a bed of granular material through which dust-ladened gases are caused to pass, with the result that the dust particles are retained by said granular material while the gases are caused to move on through the material and away from the accumulating particles of dust retained by said material or caused to settle in a current-free portion of the container for said granular material.

One of the main objects of the present invention is to provide an improved filter of the character referred to in which I am able to take full advantage of the tendency of dust particles to adhere to the surfaces of granular materials, and also of the baffling action of these surfaces which retards the movement of the dust particles and causes them to settle and to be retained within the bed of granular material.

Another object of my invention is to provide an improved construction and arrangement of cell for receiving, holding and guiding the granular materials in a slow movement, said cells being arranged in vertical tiers with their side walls perforated or made of reticulated material whereby the dust-ladened gases can be caused to pass transversely through said cells and through the granular material therein while said material moves slowly downwardly in an inclined direction.

Another object of my invention is to provide improved means within a cell to cause the granular materials therein to move more uniformly from the upper end of the cell to the lower end thereof, said improved means relieving the pressure of the mass of material at the lower end of the cell and which acts to form a dead area extended toward the upper end thereof by reason of the friction thus produced with the sides and bottom of the cell in which the material is moving downwardly.

Another object of my invention is to provide a construction and arrangement of cell wherein the granular material moves so slowly and gradually downwardly, and transversely of the movement of the dust-ladened gases therethrough that said particles of dust will work downwardly through the material and finally come to rest in an area in the bottom of the cell which is out of the path of the gases passing transversely through the cell.

In all dust problems, particles of dust of varying sizes are carried by a current of gas along therewith and at nearly the same speed. It is necessary that these particles of dust be retarded and diverted from the path of the gas so that they can be removed as early as possible from the current of gas. A diaphragm or wall of granular material presents a very large number of obstacles and surfaces and is, consequently, very effective for such collection of dust particles. This is due to adhesion of dust to the surfaces presented by the filter medium, and also the baffling action which deflects and retards said particles of dust and causes them to gradually work down through said filter material.

If a wall or diaphragm is too high and the dust-ladened gas is caused to pass transversely therethrough, while said dust particles will be moved forwardly and downwardly, they will also be carried out at the other side of the filter with the gas, and thus defeat the purpose of the apparatus. If the height of the cells forming the wall or diaphragm is suitably limited, the particles of dust entering one side, in the upper part thereof, will encounter the bottom part of the filter cell before reaching the opposite side thereof, and will be arrested and retained in the bottom of the cell below the out level of the opposite side of the filter cell.

It will be understood that the separation of dust from gas results from the reduction in horizontal linear speed resulting from the passage of the dust and air particles through the tortuous channels defined by the granular separating material. The result of this is that as the dust and gas pass through the separating wall of pebbles, the dust particles travel downwardly under the influence of gravity along a path inclined downwardly to the path of the gas, the gas path being independent of gravity. It will be understood under these circumstances that the width of the cell or wall or mass of foraminous material through which the gas and air passes must be great enough with respect to the height so that each individual dust particle will have time to travel downwardly across the gas stream a sufficient distance to be caught in the dead gas space at the bottom of the cell. If the cell is proportionately too high or proportionately too narrow then some of the dust particles will be able to pass through the cell before getting out of the relatively rapid moving stream of gas and so before reaching and being deposited in the dead gas space.

In order to take advantage of this feature, I have, after much experimentation, worked out a form of filter cell in which the bottom is formed as a trough, whereby a portion of the filter material is retained below the lowest point of entrance of gases and below the lowest part of the path of these gases passing transversely through the cell from one side to the other during the travel of the filter material downwardly lengthwise of the cell. Thus I have provided a continuous dead space throughout the length of the cell into which the moving gas does not penetrate, but into which the dust particles are deflected or carried by the downwardly and forwardly moving body of granular material, while the gas, freed of dust particles, passes upwardly and outwardly through the opposite side of the filter cell.

Another important feature of my invention has to do with the means for relieving the weight of the granular material in the cell as it moves downwardly. The filter material in my cells is disposed upon sloping surfaces, inclined at an angle greater than the angle of repose of such material. I have found that a mass of granular material on an inclined surface does not flow evenly downwardly, but that the material tends to stop by reason of the friction with the bottom and sides caused by the weight thereupon, while the remainder flows in restricted paths or channels. The result is that these particles which stand or are held back become filled with accumulated dust which renders that portion of the cell useless as a filter. I have invented and reduced to practice means for relieving this weight so that the material from the upper end and the entire mass moves slowly downwardly as a body without leaving any part without movement. I provide a separate discharge chute for each cell, and these chutes terminate or discharge in a governing means which removes the same amount from every cell in the tier, thus insuring that no cell remains full without circulation or movement of the granular material.

It is important that the linear speed of the gases be held below the so-called "critical speed" or that at which turbulence begins, which critical point is, in the size of the passage being considered, something less than ten linear feet per second. At this slow speed, the gas does not tend to take the shortest path across the cell, but rather it travels by streamline action in a parallel mass through the interstitial area. The gas does not make a sharp angle at the turn which it is forced to make by the form of the cell, but rather it moves in a downward or U shaped curve, leaving the lower point of the V as a dead area.

The critical speed may best be determined by empirical methods because it depends on the size and shape of the pebbles, to some extent on atmospheric conditions, and to some extent on the character of the gases and dust being handled. The critical speed merely means the speed above which the gas tends to rush through the cell along straight lines as distinguished from speed below the critical speed at which the shape of the cell walls tends to cause the gas to travel in a parallel mass, guided by the contour of the cell walls and so to travel a more or less U-shaped path across the cell.

As a general proposition, experience seems to teach that a pebble of about one-half inch in diameter is right but pebbles of greater or less diameter in combination with velocities greater or less, are satisfactory and the controlling factor is whether or not the speed is great enough to upset this characteristic travel of the gas along a curved or U-shaped path which is the desired method of operation.

I have found that in any sloping cell of a size practical for commercial use, the material therein tends to flow more rapidly in the area next to the top plate, while that against the bottom, retarded by the weight of the superincumbent material is held back, resulting in the formation of a dead or still triangular area in the upper end of the cell. To prevent this action, I have invented and reduced to practice and tested a form of cell shown in the drawings, and in which I have placed an inverted trough or arch-like member, in cross section, similar to the shape of the discharge openings at the lower ends of the individual cells. This member extends upwardly parallel with the bottom of the cell, but above it, to a point where it would penetrate the lower end of this dead or still area. In operation, the dead material from the hopper end of the cell flows into the upper end of this tapering arched member, and being relieved of the weight of the superimposed material, it passes freely downwardly to the discharge. The material in the cell and further down along the trough, enters under its opposite sides or the lower edges thereof, and having only the weight of a small amount of material to sustain, it also flows freely under the arched member to the discharge. The material at the lower end of the cell also flows through the under edges of said member and to the discharge chutes, as hereinafter described more in detail, in connection with the accompanying four sheets of drawings showing one practical embodiment thereof, which I will now describe.

Figure 1:
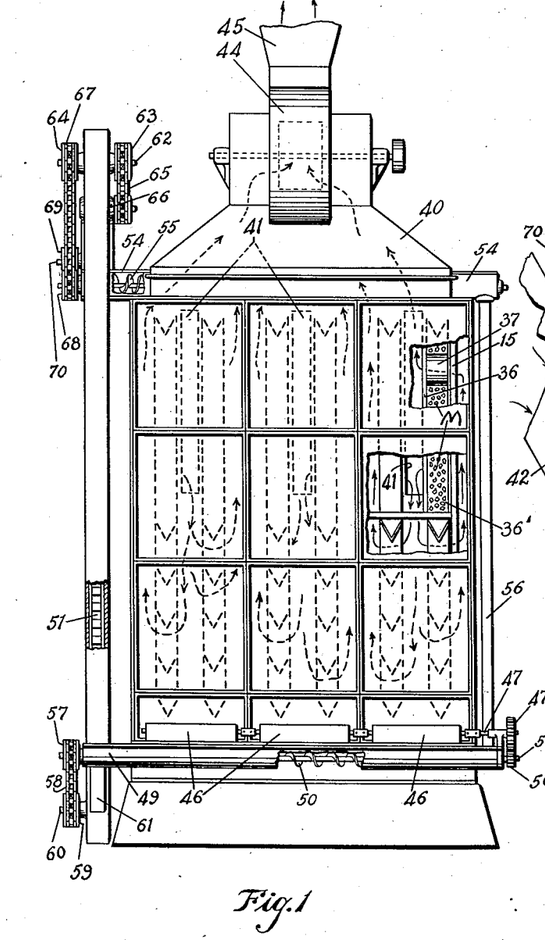
Figure 1 is a front elevation of an apparatus for filtering gas and the like, and embodying my invention, as actually constructed and operated experimentally.
Figure 2:
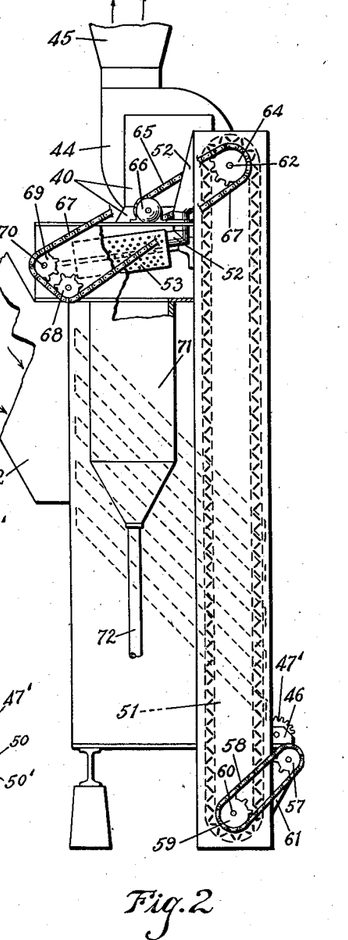
Figure 2 is an end elevation thereof.
Figure 3:
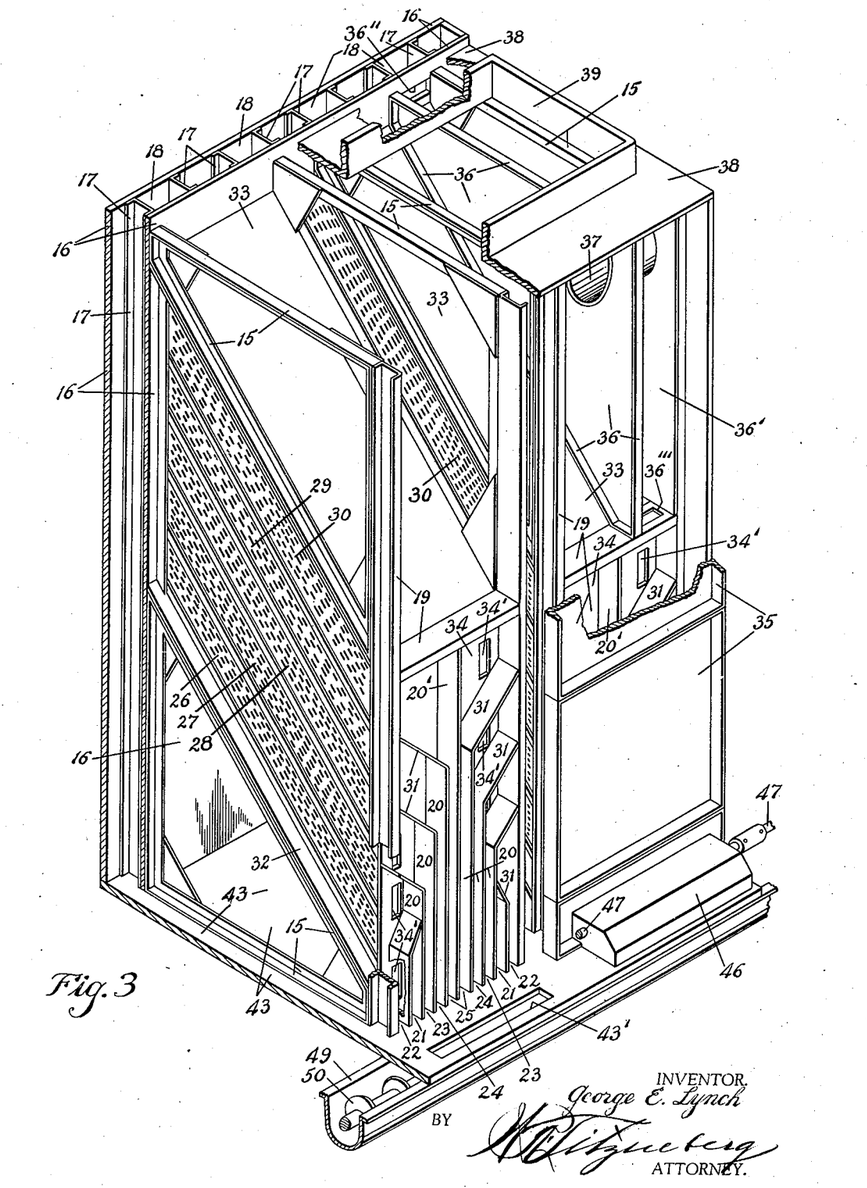
Figure 3 is an isometric view of an apparatus embodying my invention and showing two adjacent units, with parts broken away to show something of the interior construction and arrangement.

Referring in detail to the drawings, I will describe my invention as here illustrated for explanatory purposes. In Figs. 1, 2 and 3, it will be seen that the invention contemplates a gas tight housing, and that this housing includes therein frame members of triangular form, as 15, 15, at top and bottom of each side of each unit, connected at their rear ends to a double wall structure, 16, with the channel members, as 17, spaced therein and forming two vertical passageways, 18, 18, in each unit. The fronts of said triangular frame members 15, 15, are also connected with a double wall structure, 19, within which are the vertical partition members, as 20, on opposite sides of a middle partition 20'. The upper ends of said partitions 20 each has an inclined guide section, designated 31, immediately under the discharge opening from its cell. The partitions 20 form separate chutes, designated 21, 22, 23, 24 and 25, at each side of the middle partition 20', for a purpose hereinafter explained.

Mounted in said frame members 15, in a downwardly inclined position, are two tiers of separate cells, designated 26, 27, 28, 29 and 30, one above the other, with their upper ends open to communicate with the two vertical passageways, 18, 18, and their lower ends open to discharge into the double wall structure 19, and into the corresponding vertical chutes 21, 22, 23, 24 and 25, the chutes at opposite sides of the middle partition 20' communicating with the different tiers of cells of each unit. In Fig. 3 I have shown two units side by side, each unit being composed of two laterally spaced tiers of cells, arranged one above the other, with five cells in each tier.

For convenience of construction, it will be noted that the lowermost cell discharges directly downwardly through chute 21, while the next cell above has its inclined upper end directed outwardly instead of inwardly, as in the case of the other partitions, and discharges through chute designated 22.

The cells rest upon an inclined bottom plate or wall, 32, and at their top are covered by an inclined top plate or wall 33. These bottom and top plates are secured to the lower and upper triangular members in any suitable manner. Said cells are covered at their lower ends with an end plate or wall 34, forming the inner wall of the double wall structure 19, and this wall 34 is provided with vertical outlet openings, as 34'. The outer wall member of said double wall structure 19 is designated 35, shown at the right hand side of Fig. 3.

In order to provide a chamber or bin for excess filter material, a wall member 36 is shown enclosing a triangular space above the last upper cell in the series. See upper right hand corner of Fig. 3. An opening therethrough, marked 37, is provided so that the gases which have passed through the outer tier of filter cells can flow into the upper discharge chamber, as indicated by the light broken lines and arrows, Fig. 1.

The structure is provided with a top, designated 38, having an opening 39, therethrough and over which is placed a hood 40, Fig. 1, said opening 39 and said hood 40, extend over both units of the structure, as illustrated in Fig. 3. In Fig. 1 there are shown three filter units, each with two tiers of filter cells, with the gas entrance spaces, designated 41, 41, and shown between the pairs of tiers of cells of each unit. These entrance spaces 41 communicate at the rear of the structure with a gas feed conduit, designated 42, Fig. 2. A bottom wall or floor 43 is also shown, as the structure must be gas tight. The hood 40 is of tapering form and connects with a fan case 44, which develops the difference in pressure at the outer opposite sides of the wall or diaphragm formed by the tiers of filter cells and causes the dust ladened gas to be drawn through the filter cells and directed upwardly toward the fan, as indicated in the light arrows in Fig. 1. From the fan case and its outlet, at 44, the dust free gas is discharged through a pipe 45, or, if the gas is to be retained, it would be conducted to any suitable place of storage.

The granular material which constitutes the filter material is fed downwardly through the vertical passages, designated 18, in the rear double wall structure and into the upper ends of the filter cells 26, 27, 28, 29 and 30. As said filter material moves slowly downwardly through the separate cells, the filtering process takes place, as indicated, and as again referred to. At the lower ends of said filter cells, the material is discharged through the respective openings, as 34', through the wall or plate 34, and into the respective chutes 21, 22, 23, 24 and 25, one tier of filter cells discharging at one side of the middle partition 20' and the other tier of filter cells of the same unit discharging into the corresponding chutes on the other side of said middle partition 20', as will be understood from Fig. 3, at the left hand side.

Figures 10, 11, 12:
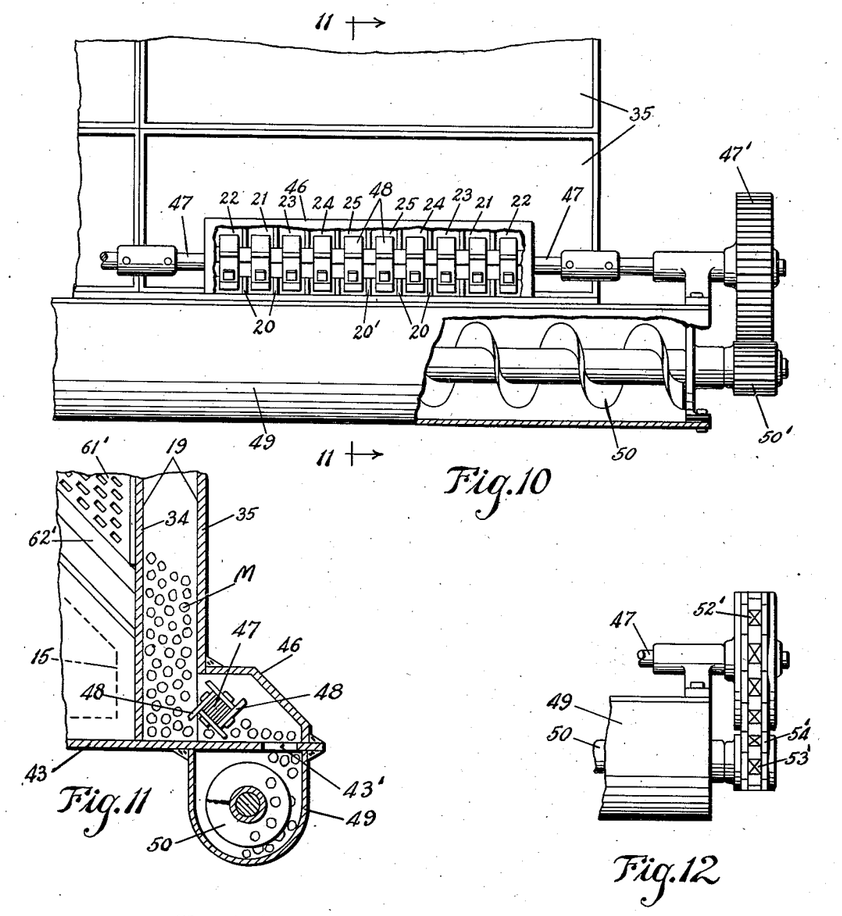
Figure 10 is an enlarged front elevation of the lower part of the structure, showing the means for governing the feed of the granular material at the discharge mouth of each cell, and showing the conveyor means for moving it to an elevator.
Figure 11 is a vertical sectional view of the same mechanism, taken on the line 11—11 of Fig. 10.
Figure 12 is a detail showing sprocket chain drive for the governor and conveyor.

Referring to Figs. 10 and 11, and particularly Fig. 11, it will be seen how said granular material is discharged from said chutes on to the floor 43, which is extended out under said chutes to the front of the apparatus as shown. Mounted upon said floor, out in front of the discharge chutes, and over a discharge opening 43' therethrough, is a feed control box 46, within which is mounted a shaft 47 of rectangular or prismatic section, adapted to move the material outwardly toward said discharge opening 43' with each revolution of said shaft 47. Said shaft is shown as square and provision is made of holes opposite each chute, whereby fingers or lifters 48 may be attached to register with any chute in which an increased flow of material is desired. This is desirable, since some cells accumulate more dust than others, owing to their location in regard to the intake pipes, and more rapid circulation in such cells is thus made possible. Mounted under said floor extension and said discharge slot or opening 43' is a conveyor trough 49, with a screw feed conveyor 50 therein for feeding said granular material to the end of the said conveyor trough 49 and discharging it down into an elevator, designated as a whole 51, for conveying said material to the top of said apparatus and discharging it into a hopper-like member 52, which in turn directs said material into a revolving cylindrical screen 53, and from the lower end of which it is discharged again into the horizontal conveyor 54 and in which, by means of a screw 55, it is conveyed along over the upper ends of the vertical passageways 18, 18, leading to the filter cells, as before described. As said passageways 18, 18, fill, said material is carried along and filled into the overflow storage space 36', formed by the wall 36, Fig. 1, and if this storage space is filled, said material is carried to the end of the conveyor trough 54, and discharged into an overflow pipe 56, by which it is directed down again to the lower conveyor trough 49.

The feed shaft 47 is shown provided with a gear 47', while the conveyor shaft 50 is provided with a pinion 50', in mesh with said gear 47', as shown in Fig. 10, for driving both together.

In Fig. 12, instead of gears, I have shown sprockets 52' and 53', with sprocket chain 54', for driving the feed shaft 47 and the conveyor screw 50.

Figure 13:
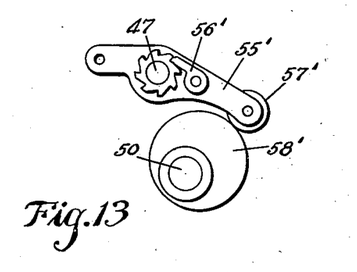
Figure 13 is an eccentric cam and ratchet pawl, and lever, for operating the governor.

In Fig. 13, I have shown the feed shaft 47 provided with a lever 55', operating a ratchet and pawl mechanism 56', said lever having a roller 57' at its end adapted to be intermittently operated by an eccentric disc or roller 58' on the conveyor shaft 50. These are merely alternate means for operating the feed shaft and the conveyor together.

At the discharge end of the conveyor trough 49, the shaft of the screw conveyor 50 is provided with a sprocket wheel 57, over which runs a sprocket chain 58 from a sprocket wheel 59 on the shaft at the lower end of the vertical conveyor 51, said shaft being designated 60. A receiving chute or boot 61 receives the granular material from the conveyor 50 and directs it into the buckets of the vertical elevator 51, in the usual and well known manner. At the upper end of said vertical conveyor 51 is a sprocket shaft 62, on the outer ends of which are sprocket wheels, as 63 and 64. From sprocket wheel 62 is a sprocket chain 65 to the motor 66, by means of which said mechanisms are driven. From the sprocket wheel 64 is a sprocket chain 67 extended to the sprocket wheel 68 on the outer end of the horizontal conveyor 55, for driving said conveyor. This sprocket chain 67 also drives a sprocket wheel 69, on a shaft 70, connected, as by means of bevel gears (not shown) for driving the cylindrical screen 53, before referred to. As this mechanism is readily understood, it is not believed that further detail drawings of these connections will be necessary.

As the dust is screened from the granular material passing through said revolving screen 53, it is directed downwardly into a vertical hopper 71, at the lower end of which is an outlet pipe 72.

Figures 4, 5, 6, 7, 8, 9:
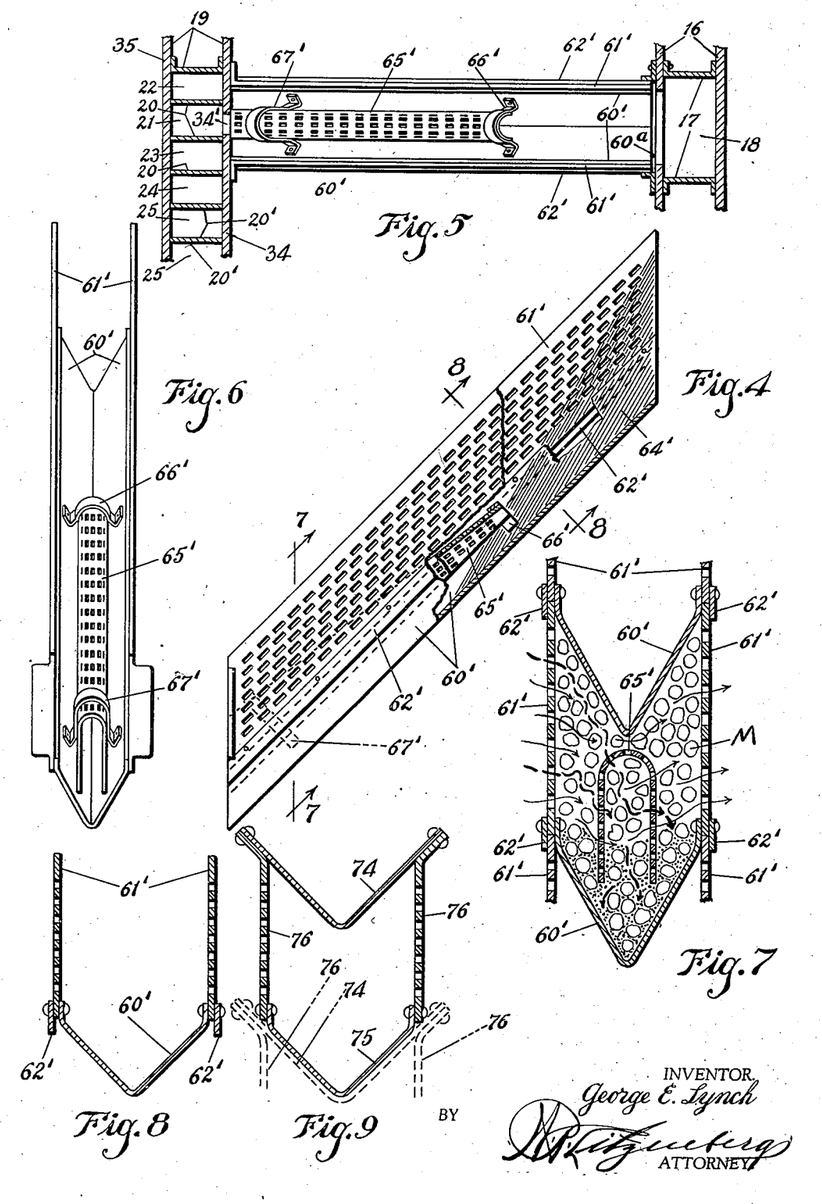
Figure 4 is a side elevation of one of my improved cells removed from the apparatus, with parts broken away and shown in section.
Figure 5 is a plan view looking down into said cell, with feed and discharge means shown at the upper and lower ends, respectively.
Figure 6 is a front elevation of the same cell showing my improved weight distributing member therein.
Figure 7 is a vertical cross sectional view of a cell, taken on the line 7—7 of Fig. 4, and showing the lower part of the cell next above.
Figure 8 is a cross sectional view through the perforated side walls and bottom of a cell, taken on the line 8—8 of Fig. 4.
Figure 9 is a similar view showing a modified construction of cell.

Referring now to Figs. 4 to 9 inclusive, I will describe the construction of my improved filter cells. In Fig. 7 I have shown a vertical cross sectional view of a filter cell composed of a V-shaped trough 60' connected at its opposite upper sides with perforated side plates 61', 61', by rivets or bolts, and with outer confining strips, 62', 62', forming with the sloping sides of the troughs 60', 60', an interlocking means, whereby it is engaged with and sets down over the adjacent cells above and below, as indicated by broken lines in part.

The granular material, designated M, is shown filling the lower cell, while the light arrows indicate the path of travel of the dust ladened gas, and the heavy broken arrows show the general course of travel of the dust particles, settling down into the bottom of the cell, below the path of the gas passing transversely through the cell and out at the opposite side.

In Fig. 4, at the upper end, I have indicated by the triangular shaded portion 64', an area where the granular material tends to be held at rest by reason of the friction with the sides and bottom and the weight of the material resting upon it. In order to avoid this, I have provided in the cell trough 60', an inverted U-shaped or arched and tapering member 65', supported in the trough by means of clips, as 66' and 67', the lower sides of said member 65' being spaced above the bottom sides of the cell body 60', whereby the granular material can flow inwardly and downwardly under the same, while the area of granular material, designated 64' in Fig. 4, instead of being held still, will flow into the open upper end of said member 65', and the entire mass of material will, therefore, move gradually and uniformly downwardly to the discharge opening 34' in the plate 34, and into the individual chutes, as seen in Fig. 3, and before described. The filter material M, as before stated, is fed into the cells at their upper ends and flows freely into all of the cells, filling them to the top, inasmuch as their inclination is greater than the angle of repose of the material.

In Fig. 5, the side walls 61', 61', of each trough or cell do not contact directly the upper wall 16. An expansion space 60ᵃ is left between these members and the side walls of the trough. This expansion space is desirable because the apparatus disclosed must be capable of handling gases at high temperatures, sometimes as high as 1000° F. and the elongation of the cell may be considered under these temperatures as compared to its length in normal atmospheric temperatures. In one satisfactory form of the device it has been found that the elongation of each cell is approximately .82 inch, which is in excess of any normal possible movement between parts bolted or otherwise rigidly secured. To permit this expansion the space 60ᵃ is provided.

In Fig. 8, I have shown a plain sectional view through the perforated side walls and bottom, taken on line 8—8 of Fig. 4, or at right angles, and in Fig. 9, I have shown a modified costruction in which two V-shaped members 74 and 75 are shown riveted to the upper and lower edges, respectively, of two perforated side members 76, 76, and in dotted or light broken lines below, I have indicated how one such unit can be seated upon another of the same kind in building up a tier of cells to form a wall or diaphragm through which the granular material can flow, and through which, transversely, the gas can be passed, as before described.

Referring particularly to Fig. 7, it will be seen how the cell is filled with granular filter material, which can be of any suitable material, and how the dust ladened gas enters at the left side and passes transversely through the cell and out at the opposite side, and how the dust particles by the baffle action of the particles of the granular material are caused to settle downwardly, as indicated by the heavy broken arrows, until they fall below the lowest part of the path of the gases, indicated by the curved light arrows, and how the arched member 65', facilitates the more even and general flow of the granular material downwardly toward the lower end of the cell, from which it is discharged through openings 34', Fig. 3, to the chutes 21, 22, 23, 24 and 25, and is thence carried back, through the different conveyors, to the top part of the apparatus for reuse, after being screened and relieved of the dust gathered thereby.

Another item of consideration is that during the continuous circulation of the granular material through the cells and the conveyors and elevator, there is a certain amount of loss by abrasion, wear, breakage and disintegration of such material and this reduced material is removed from the mass through the rotary screen. Unless additional material is added to replace this loss, no matter from what cause, there is danger of leaving parts of the upper cells empty and thus defeating the object of the apparatus by permitting the dust to pass. It is in order to render such replacement easy and automatic and to extend the time during which the filter may operate without loss of time to make such replacements that I have provided an excess material bin 36' above the last upper cell in the series. An opening 36" is provided in the last chamber 18, above the top plate 33 of the cells. When all cells are filled, any further material added to the system flows into this opening and fills the bin 36' until said material lies at its angle of repose therein. Any more material than is required to fill said bin is passed on to the overflow pipe 56, and is returned to the lower conveyor, as already described. The excess material in said bin 36' flows down through an opening 36''' into the triangular space at the top of chute 25, in the last series. When material is circulated, a small amount of the excess material enters the circulation at this point and follows through the lower conveyor, the elevator, the screen, and the upper conveyor and is returned to bin 36', minus whatever amount has been absorbed in replacing loss. This provision assures that all cells will be kept filled to the top and as long as any excess material remains in bin 36'.

The filter material may be of any substance which can be obtained in nodular or pebble-like form, sufficiently hard and tough to withstand the slight abrasion in circulation and of composition capable of resisting the effect of the gases being handled in the filter. Under ordinary conditions, smooth water-worn pebbles of any hard rock prove suitable when screened to approximately uniform diameter. In practice, pebbles passing ¾" mesh and resting upon ½" mesh have proved satisfactory. Pebbles or nodules, either natural or artificial, may be used for special conditions of heat or acidity of gases, the chemical composition of these being selected to resist the effects, or to absorb undesired elements of the gas. For certain conditions, the pebbles themselves may be composed of substance which will react chemically with the gases to obtain desirable results. In other words, pebbles of chemically inert composition may be coated or impregnated with reagents, such as acid or alkaline solutions which will react with the gases, or the inert pebbles may be charged or impregnated with a catalyzer, such as nickel or other metallic oxides in order to cause a change in the gases by catalysis. For extremely sticky dust, rounded pebbles or artificial bodies such as common marbles may be used, these being immersed in a bath of solution which removes the dust coating during circulation, instead of being passed over a screen.

I would also call attention to the fact that an apparatus such as I have described, without material mechanical change or departure from the specified construction, can be used as a classifier or concentrator wherein finely divided materials of different specific gravity may be separated or concentrated in a manner similar to that obtained by the dry concentrating tables used in winning gold or other valuable minerals. The finely divided mixed matters are drawn into the cell, suspended in a current of air which has a speed greater than that used in dust collecting, whereby the lighter particles are caused to pass entirely through the filter mass and to emerge at the opposite side of the cell, while the particles of greater specific gravity settle into the dead space at the lower part of each cell and are thus collected and saved. This form of concentrator has the advantage that the separated dust may be either collected or else discharged at a distance from the operation, so that it cannot cause a nuisance or hinder the work.

I do not, therefore, limit my invention to the details of construction and arrangement shown, except as I may be limited by the hereto appended claims.

I claim:

1. In a dust collecting apparatus, a filter cell of trough-like form to receive filter material to move longitudinally therethrough and an arched member supported therein and extending longitudinally thereof and open at its opposite ends, whereby material can pass therethrough in said cell, said member supporting part of the weight of the material above it, whereby to cause more uniform movement of material through said trough.

2. In an apparatus of the character referred to, an inclined cell of V-shape in cross section and adapted to receive filter material at its upper end to move slowly therethrough longitudinally, an inner member of inverted U-shape and of tapering form longitudinally, supported in said cell to relieve some of the weight of the material therein and cause a more uniform movement of filter material through said cell from one end to the other.

3. In combination, a series of filter cells supported in an inclined position, one above the other, to receive filter material at their upper ends and to discharge it at their lower ends, means at their lower ends for governing the flow of filtering material, means for receiving the filtering material therefrom, means for elevating said material to the upper ends of said cells for refeeding it to said cells, means forming an auxiliary bin open at its upper end to receive filter material when said cells are filled to their upper ends, said auxiliary bin having a discharge outlet at its lower end to the means for governing the flow of discharged material from the cells, and means for delivering excess material, after the cells and auxiliary bin are filled, to the means for receiving said discharged material from said cells.

4. In an apparatus of the character referred to, a plurality of units, each unit consisting of two tiers of filter cells spaced apart horizontally, each tier consisting of a plurality of separate cells mounted one upon the other in an inclined position, space being provided for linear expansion of said cells, means for feeding filter material to the upper ends of said cells, each cell having its opposite walls perforated for passing dust-laden gas transversely therethrough, each cell having a V-shaped bottom, means for causing the movement of said gas into the space between said tiers and thence transversely through said cells, means for receiving said filter material at the discharge ends of said filter cells and elevating it to the upper ends thereof, and a tapering weight-supporting member extending longitudinally in each of said cells and inclined upwardly away from the bottom thereof for causing a uniform movement of said filter material slowly downwardly therein.

5. In an apparatus of the character described, a plurality of units, each unit consisting of two tiers of filter cells spaced apart horizontally, each tier consisting of a plurality of separate cells mounted one upon the other and movable relative to each other under expansion and contraction, said cells being arranged in inclined positions, means forming an auxiliary bin adjacent said cells to receive filter material, means for feeding filter material to the upper ends of said cells, each cell having its opposite walls perforated for passing dust-laden gas transversely therethrough, means for causing a difference of pressure in alternate spaces between tiers so that dust-laden gas is caused to pass between the tiers and thence transversely therethrough and through the filter material therein, means for governing the flow of discharged material at the lower ends of said cells, means for receiving said filter material from said governing means, and means for elevating it to the upper ends of said cells and said auxiliary bin for filling them with said filter material, said auxiliary bin having means for discharging said filter material into the means for receiving the filter material at the discharge ends of said cells and the means for elevating it to the upper ends thereof.

6. A gas pervious, dust impervious separating wall comprising a plurality of trough-like interlocking sections having apertured side walls joined along their lower edges by an imperforate V-shaped bottom, said sections being adapted to be mounted one upon another with the V-shaped bottom of an upper section penetrating into the upper portion of a lower section, means for continuously supplying a mass of granular material to one end of and for withdrawing it from the other end of each section at a rate sufficient to maintain each section constantly filled with the granular material and means for causing the flow of a current of dust laden air to and through said wall, means for withdrawing dust and granular material from the lower portions of each of said sections and for separating the dust from such granular material, the sections being held together by their interlocking relationship alone, their interlocking portions being free to move with respect to one another longitudinally without interference other than by friction.

7. A filtering mechanism comprising a plurality of separate, independent cells having opposite sides of reticulated metal and V-shaped bottoms of impervious material, and provided with means along the lower edges of their opposite sides, whereby one cell interfits upon another cell with its V-shaped bottom extended thereinto, said cells being filled with granular material, and means whereby said granular material is caused to move slowly through said cells longitudinally, while the fluid being filtered is moved transversely through said cells and said material above the V-shaped bottoms of said cells.

8. A filtering mechanism comprising a plurality of separate, independent cells having opposite side walls of reticulated metal and V-shaped bottoms of impervious material, and provided with means along the lower edges of their opposite side walls, whereby one cell can be interfit slidably upon the cell below it with its V-shaped bottom extended thereinto, means supporting said cells one upon the other in an inclined position, said cells being filled with granular material moving slowly downwardly therein from the upper ends thereof to the lower ends thereof lengthwise of said cells, and means causing fluid to be filtered to be moved transversely through said cells and said material above the bottoms thereof, said bottoms forming a collecting area for dust particles.

9. A filtering apparatus comprised of a vertical stack of separate, independent cells, each having opposite side walls of reticulated material and V-shaped bottoms of impervious material, and having means along the lower edges of their side walls to interfit with the cell thereunder, means supporting said cells in inclined positions one upon the other with the V-shaped bottom of an upper cell extended into the next cell thereunder. means for causing a difference of pressure on opposite sides of said cells so that gas to be filtered is caused to pass transversely through the perforated walls of said cells above the V-shaped bottoms thereof, means for feeding granular material to the upper ends of said cells to move slowly downwardly therethrough, means for governing the movement of said material therefrom and means for carrying said granular material from the lower ends of said cells to the feeding means at the upper ends thereof.

10. In an apparatus for filtering gas and the like, a series of cells interfitting one upon the other in an inclined position in closed housing, said cells being arranged in two tiers, spaced apart, and each cell consisting of two side walls of reticulated metal with a V-shaped bottom member secured therebetween, at the lower edges thereof, whereby the lower edges of one cell will fit upon the upper edges of the cell thereunder, with the V-shaped bottom of the upper cell extending between the side walls of said cell thereunder, means along the outside of the meeting edges of upper and lower cells to hold them movably one upon the other. means for moving granular material through said cells, and means for causing gas and the like to move transversely through said side walls and the material therebetween, above the area of the V-shaped bottoms of said cells.

11. In an apparatus for filtering gas and the like, a housing, two tiers of cells, spaced horizontally, means for causing a difference of pressure in alternate spaces within the housing so that gas is caused to enter between the tiers and to pass transversely therethrough, means for feeding granular material longitudinally through said cells to have a baffling action on dust particles carried thereto by said gas on its way through said tiers of cells, each of said cells having side walls of reticulated metal, with a V-shaped bottom member of impervious material secured therebetween, at the lower edges thereof, whereby the side walls of all cells of each tier rest edgewise upon each other in the same planes, with the bottoms extended from one cell into the cell thereunder, said cells being supported in an inclined position and having means for longitudinal expansion under heat, and means in each cell to facilitate the uniform movement of the granular material slowly through said cells from their upper ends to their lower ends.

12. In an apparatus of the character shown and described, a filtering wall composed of a series of cells placed one upon the other in an inclined position, each cell having opposite side walls of reticulated metal and a bottom member of impervious material having its opposite edges secured to the inner sides of said side walls, whereby to leave the lower edges of said side walls to rest upon the upper edges of the side walls of the cell thereunder, said bottoms forming an area for granular material below the reticulations of the side walls, means for feeding granular material to the upper ends of said cells to flow slowly and uniformly therethrough to the lower ends thereof, means in each cell to facilitate the uniform movement of granular material therethrough, and means for passing gas ladened with dust transversely through said reticulated side walls and the granular material therebetween, above the bottom members, whereby said bottom members catch and retain dust particles baffled downwardly by said granular material out of the gas passing transversely through said filtering wall.

GEORGE E. LYNCH.